United States Patent [19]

Goshima et al.

[11] Patent Number: 4,986,611
[45] Date of Patent: Jan. 22, 1991

[54] ANTI-LOCK BRAKE CONTROL SYSTEM FOR USE IN MOTOR VEHICLE

[75] Inventors: Takahiro Goshima, Gifu; Kazutoshi Yogo, Showa; Hideo Wakata, Midori; Masashi Kishimoto, Chiryu, all of Japan

[73] Assignee: Nippondenso Co., Ltd., Kariya, Japan

[21] Appl. No.: 483,214

[22] Filed: Feb. 20, 1990

[30] Foreign Application Priority Data

Feb. 20, 1989 [JP] Japan .................................... 1-39754
Aug. 1, 1989 [JP] Japan .................................. 1-199895

[51] Int. Cl.$^5$ ............................................. B60T 8/32
[52] U.S. Cl. .................................... 303/100; 303/106; 303/116; 303/119
[58] Field of Search ............... 303/119, 116, 111, 113, 303/91, 102, 103, 106, 100, 96, 99, 97, 104, 105, 110; 364/426.02, 426.01; 188/181 A, 181 C

[56] References Cited

U.S. PATENT DOCUMENTS

| | | | |
|---|---|---|---|
| 3,637,264 | 1/1972 | Leiber et al. | 303/105 |
| 4,099,793 | 7/1978 | Iio . | |
| 4,123,116 | 10/1978 | Carp et al. | 303/103 |
| 4,865,397 | 9/1989 | Inoue et al. | 303/119 X |
| 4,939,656 | 7/1990 | Hoashi et al. | 303/106 X |

FOREIGN PATENT DOCUMENTS 51-6308  2/1976 Japan .
56-82649 7/1981 Japan .

Primary Examiner—Douglas C. Butler
Attorney, Agent, or Firm—Cushman, Darby & Cushman

[57] ABSTRACT

An anti-locking control system for use in a motor vehicle having four wheels, comprising a hydraulic pressure supply system for applying a braking pressure from a master cylinder to two pairs of wheel-braking cylinders for braking the pair of wheels and a pump provided in common for the two pairs of cylinders in the hydraulic pressure supply system to decrease both the braking hydraulic pressures in each pair of wheel-braking cylinders. The hydraulic pressure supply system includes a pair of control valves each of which is arranged to have a first position at which the master cylinder is communicated with each of the pair of wheel-braking cylinders and a suction side of the pump is disconnected to the wheel-braking cylinder and a second position for disconnection to the wheel-braking cylinder and communication with the cylinder. Also provided in the control system an electronic control unit for effecting duty control of the pair of control valves so that the time periods at which the pair of control valves are at the second positions are not overlapped with each other. With this arrangement, although the pressure-decreasing is effected by one pump provided in common for the respective wheel-braking cylinders, it is possible to adequately effect the pressure-decreasing with respect to the lower-pressure side wheel-braking cylinder.

9 Claims, 10 Drawing Sheets

ANTI-LOCK BRAKE CONTROL SYSTEM FOR USE IN MOTOR VEHICLE

BACKGROUND OF THE INVENTION

The present invention relates generally to anti-lock, or anti-skid, control systems for use in motor vehicles, and more particularly to such an anti-lock system which effects the anti-lock control by controlling the duty ratio of a two-position valve associated with each of wheels of the motor vehicle.

Various types of anti-lock control systems have been developed heretofore with a view to preventing a locking of a wheel of a motor vehicle which can occurs in response to a braking operation effected when the motor vehicle is running. One previous approach to resolution of this locking problem is to use a reservoir for decrease in the braking hydraulic pressure to be supplied to a wheel-braking cylinder associated with the vehicle wheel and further to use a pump for increase in the braing hydraulic pressure to be supplied thereto. There is a disadvantage which arises with this type of anti-lock system, however, in that difficulty is encountered to achieve a side-reduction and a cost-reduction due to the provision of the reservoir. Another known arrangement involves performing the decreases in the braking hydraulic pressures to the wheel braking cylinders only by using a pump without providing the reservoir. One of problems with such an anti-lock system relates to the difficulty to independently control the braking hydraulic pressures to the wheel-braking cylinders. Thus, in the case that there is a pressure difference between the braking pressures in the wheel-braking cylinders, the pressure decrease can be performed only for the high-pressure side wheel-braking cylinder but not for the low-pressure side wheel-braking cylinder. Although the independent control for the respective braking hydraulic pressures can be performed under the condition that the pump is provided for each of the wheel-braking cylinders, this results in increase in size and cost. Further, known is an anti-lock control system as disclosed in Japanese Pat. Publication No. 51-6308, the technique of which is arranged such that the braking hydraulic pressure to the wheel-braking cylinder is adjusted in accordance with duty control of a control valve having a pressure-increasing position and a pressure-decreasing position, that is, the braking hydraulic pressure is controlled so as to prevent wheel locking by varying the duty ratio in accordance with the slip ratio of the wheel. However, in this anti-lock control system, a predetermined duty ratio is used as the initial value at the time of start of the anti-lock control execution, and therefore there is presented a time lag in variation from the predetermined duty ratio to a duty ratio adequately corresponding to the vehicle-running road surface state.

SUMMARY OF THE INVENTION

It is therefore an object of the present invention to provide an anti-lock control system which allows decrease in the braking pressure irrespective of difference between the braking pressures in wheel-braking cylinders and which is capable of size-reduction and cost-reduction.

Another object of the present invention is to provide an anti-lock control system which is capable of quickly effecting, immediately after start of the anti-lock control, the braking pressure control so as to adequately correspond to the vehicle-running road surface state.

With these and other objects which will become apparent as the description proceeds, according to the present invention, an anti-lock control system for use in a motor vehicle having at least a pair of wheels, comprises a hydraulic pressure supply system for applying a braking pressure from a master cylinder of the motor vehicle to a pair of wheel-braking cylinders for braking the pair of wheels and a pump provided in the hydraulic pressure supply system to decrease both the braking hydraulic pressures in the pair of wheel-braking cylinders. The hydraulic pressure supply system includes a pair of control valves each of which is arranged to have a first position at which the master cylinder is communicated with each of the pair of wheel-braking cylinders and a suction side of the pump is disconnected to the wheel-braking cylinder and further have a second position at which the master cylinder is disconnected to the wheel-braking cylinder and the suction side of the pump is communicated with the wheel-braking cylinder. Also provided in the control system an electronic control unit for effecting duty control of the pair of control valves so that the time periods at which the pair of control valves are at the second positions are not overlapped with each other. This arrangement allows decrease in the braking pressure in the pressure-lower side wheel-braking cylinder.

Moreover, an anti-lock control system for use in a motor vehicle having at least one wheel, comprises a hydraulic pressure supply system for applying a braking pressure from a master cylinder of the motor vehicle to a wheel-braking cylinder for braking the wheel and a pump provided in the hydraulic pressure supply system to decrease the braking hydraulic pressure in wheel-braking cylinder. The hydraulic pressure supply system includes control valve means provided between the master cylinder and the wheel-braking cylinder so as to increase and decrease the braking pressure in the wheel-braking cylinder. Also included in the anti-lock control system are locking tendency decision means for determining a locking tendency of the wheel on the basis of a wheel speed and initial value setting means for setting an initial value of a duty ratio of the control valve means to be used when the anti-lock control system starts the anti-lock control, in accordance with at least one of the degree of operation of a braking pedal effected by a vehicle driver and a condition of a road surface on which the motor vehicle is running. Duty ratio calculation means calculates the duty ratio of the control valve means on the basis of the determined locking tendency and the set initial value, whereby the control valve means is duty-controlled with the duty ratio calculated by the duty ratio calculation means.

Preferably, the initial value setting means is arranged to detect a time period from a start of the operation of the braking means to a start of the anti-lock control and further determine the degree of the operation of the braking means on the basis of an acceleration of the wheel at the time of the start of the anti-lock control, so that the initial value is set to become smaller as the operation degree of the braking means is smaller. Further, the initial value setting means is arranged to determine a frictional coefficient of the road surface on the basis of an acceleration of the motor vehicle at the time of the start of the anti-lock control so that the initial value is set to become greater in accordance with increase in the determined road surface frictional coefficient.

This arrangement causes the braking pressure to be quickly controllable in correspondance with the vehicle-running road surface condition immediately after start of the anti-lock control.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
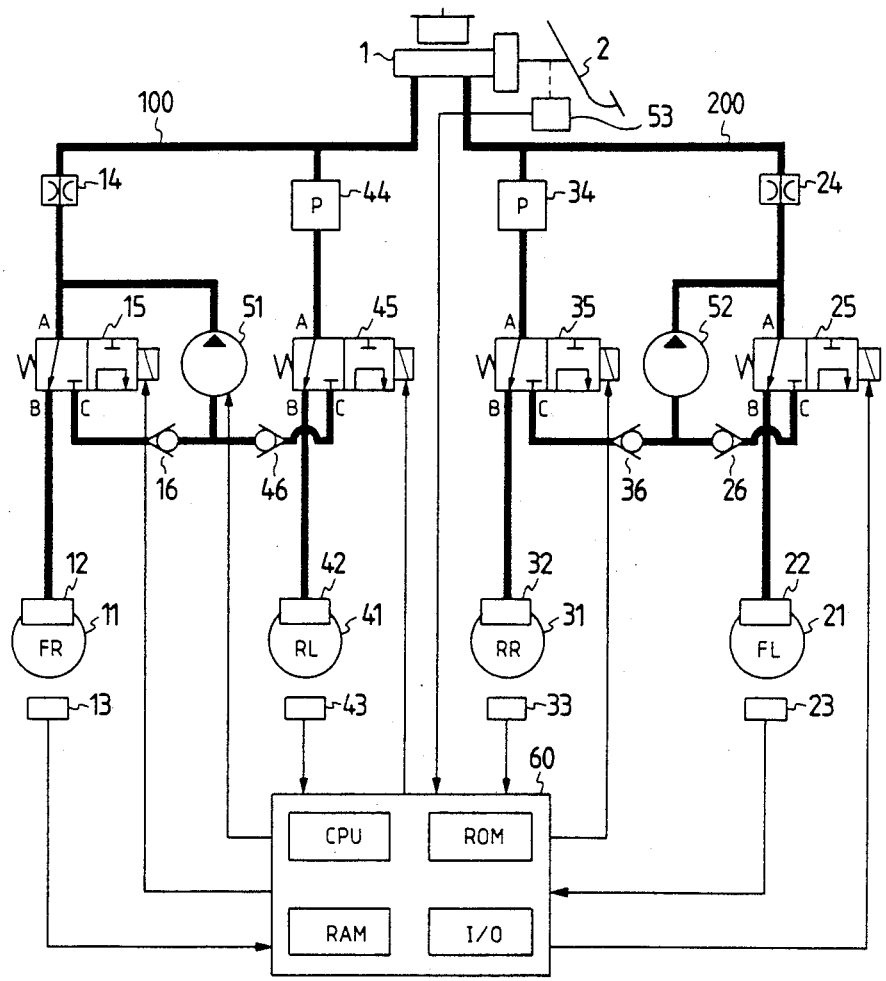
FIG. 1 is an illustration of an anti-lock control system according to a first embodiment of the present invention.

Referring now to FIG. 1, there is illustrated an anti-lock control system according to an embodiment of the present invention which is incorporated into a diagonal two-system hydraulic pressure braking apparatus of a front-wheel driven motor vehicle. In FIG. 1, the two-system hydraulic pressure braking apparatus is basically provided with a tandem type master cylinder 1 for generating a hydraulic pressure in response to depression of a braking pedal 2 of the motor vehicle and wheel-braking cylinders 12, 22, 32 and 42 which are respectively associated with a front-right wheel (FR) 11, a front-left wheel (FL) 21, a rear-right wheel (RR) 31 and a rear-left wheel (RL) 41 of the motor vehicle.

The braking hydraulic pressure generated in the master cylinder 1 is supplied through first and second hydraulic pressure supply systems 100 and 200 to the wheel-braking cylinders 12, 22, 32 and 42 associated with the respective wheels 11, 21, 31 and 41. That is, in the first hydraulic pressure supply system 100, the braking hydraulic pressure from the master cylinder 1 is applied through a restriction device 14 and a two-position valve 15 to the front-right wheel braking cylinder 12, and further applied through a proportioning valve (P-valve) 44 and a two-position valve 45 to the rear-left wheel braking cylinder 42. On the other hand, in the second hydraulic pressure supply system 200, the braking hydraulic pressure from the master cylinder 1 is applied through a restriction device 24 and a two-position valve 25 to the front-left wheel braking cylinder 22, and further applied through a proportioning valve 34 and a two-position valve 35 to the rear-right wheel braking cylinder 32. Each of the two-position valves 15, 25, 35 and 45 is of the type having three ports A, B and C and allowing switching operation between two positions. Here, the A port is coupled to the master cylinder side hydraulic pressure passage and the B port is connected to the wheel-braking cylinder side hydraulic pressure passage. The C ports of the two-position valves 15 and 45 are respectively coupled through check valves 16, 46 to the suction side of a pump 51 and the C ports of the two-position valves 25 and 35 are respectively connected through check valves 26, 36 to the suction side of another pump 52. The pumps 51 and 52 are of the integrated type arranged to be driven in common by one electric motor, the discharge sides being coupled to the A port sides of the two-position valves 15 and 25.

Included in the anti-lock control system of this embodiment is an electronic control unit (ECU) 60 which comprises a microcomputer basically including a central processing unit (CPU), a read-only memory (ROM), a random access memory (RAM), an input/output unit (I/0) and others. The electronic control unit inputs signals indicative of wheel speeds from wheel-speed sensors 13, 23, 33 and 43 associated with the respective wheels 11, 21, 31 and 41 so as to calculate wheels speeds, wheel accelerations and others to duty-control the two-position valves 15, 25, 35 and 45 and effect the drive-control of the pumps 51 and 52.

A description will be made hereinbelow in terms of operation of the anti-lock control system of this embodiment with reference to FIGS., 2A, 2B and 3, FIG. 2 being an illustration of the braking system structure for one wheel (front-right wheel 11) and FIG. 3 being a graphic diagram showing drive signals and a hydraulic pressure caused by the drive signals.

(1) Ordinal Braking Operation

Figure 2A:
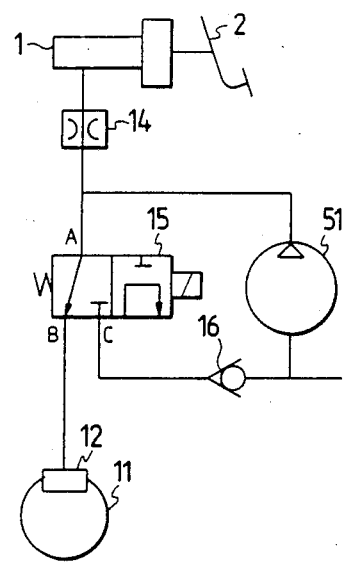
FIGS. 2A and 2B are illustrations of the braking system structure for one wheel.
Figure 3:
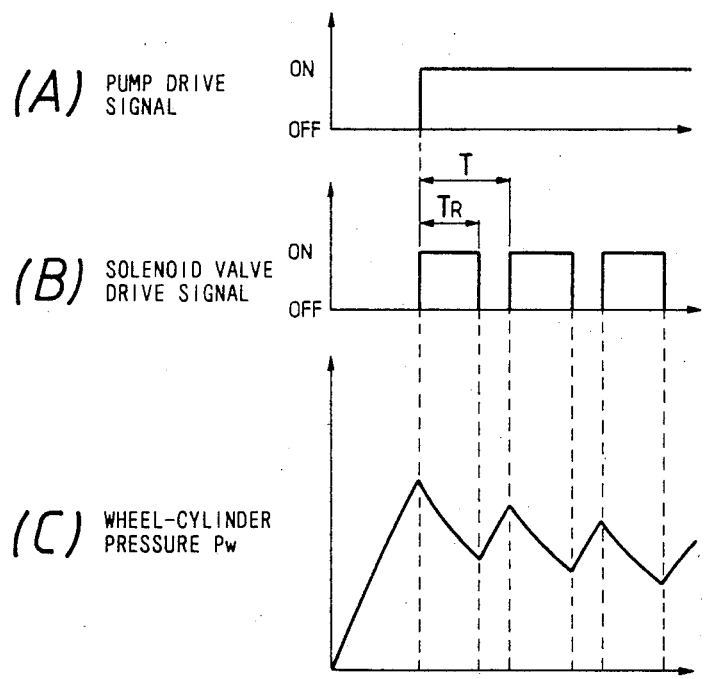
FIGS. 3a, 3b, 3c are graphic diagrams showing a wheel-braking cylinder pressure corresponding to dive signals supplied to devices in a braking hydraulic pressure supply system.

The two-position valve 15 is positioned as illustrated in FIG. 2A under the condition of deenergization and the pump 51 is in the non-driven state. Accordingly, the braking hydraulic pressure generated in the master cylinder 1 due to depression of the braking pedal 2 is applied directly through the two-position valve 15 to the wheel-braking cylinder 12 so as to brake the front-right wheel 11.

(2) Anti-lock control operation

Figure 2B:
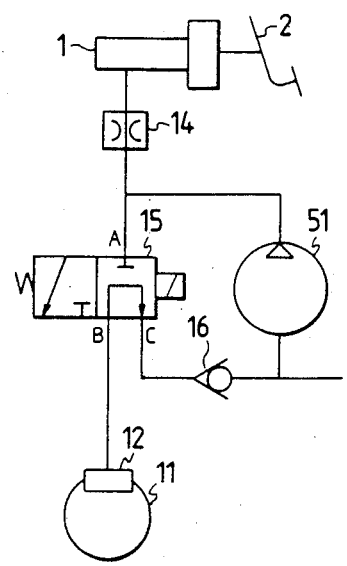

In respect to braking operation effected when the motor vehicle is running, the front-right wheel 11 enters into a given lock tendency, thereby resulting in start of the anti-lock control. In response to the start of the anti-lock control, as shown in (A) of FIG. 3, the ECU 60 outputs an ON-command signal so as to drive the pump 51, whereby the pump 51 is continuously operated during the anti-lock control. Further, as illustrated in (B) and (C) of FIG. 3, the ECU 60 duty-controls the two-position valve 15 so as to adjust the braking pressure Pw in the wheel-braking cylinder 12. Here, the two-position valve 15 is at a first position during deenergization as illustrated in FIG. 2A so as to perform communication between the A and B ports, whereby the braking pressure Pw in the wheel-braking cylinder 12 is increased due to the master cylinder braking hydraulic pressure. On the other hand, the two-position valve 15 is switched to be at a second position during energization as illustrated in FIG. 2B, so that the B and C ports are communicated with each other. As a result, the braking pressure Pw in the wheel-braking cylinder 12 is decreased due to the operation of the pump 51. The pressure-increasing and pressure-decreasing is effected as illustrated in FIG. 3 by controlling the average hydraulic pressure with the pressure-decreasing time $T_R$ (ON time of the two-position valve 15) being varied under the condition that the period T is constant (for example, 20 to 50 msec). The the ratio, $(T_R/T) \times 100\%$, of the pressure-decreasing time $T_R$ with respect to the period T will be referred hereinafter to as a duty ratio D. Here, in the duty control of the two-position valve 15, the pressure-decreasing tendency increases as the duty ratio D increases, and the pressure-increasing tendency increases in accordance with the decrease in the duty ratio D.

Figure 4:
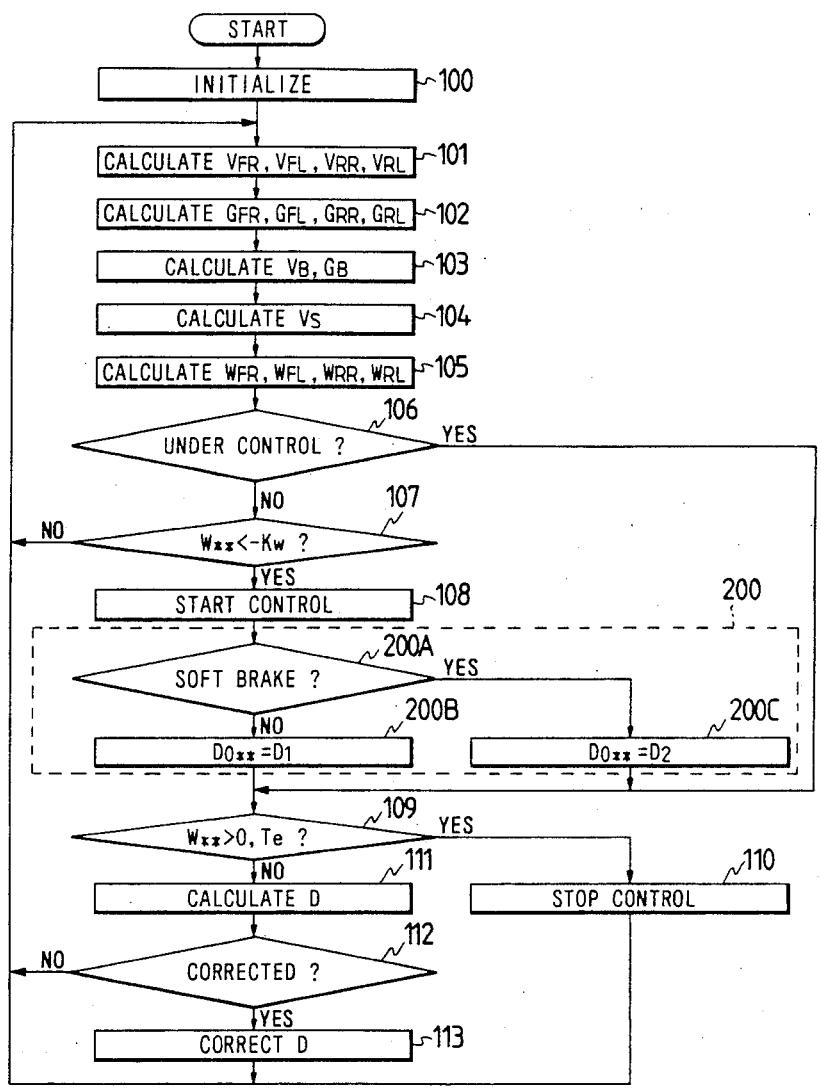
FIG. 4 is a flow chart showing operation executed by an electronic control unit provided in the FIG. 1 anti-lock control system.

A description will be made hereinbelow in terms of one example of the operation executed by the ECU 60 with reference to FIG. 4. In FIG. 4, the operation starts with a step 100 for initialization, followed by a step 101 to calculate a front-right wheel speed $V_{FR}$, a front-left wheel speed $V_{FL}$, a rear-right wheel speed $V_{RR}$ and a rear-left wheel speed $V_{RL}$ on the basis of signals from the respective wheel speed sensors 13, 23, 33 and 43. Control advances to a step 102 to calculate wheel accelerations $G_{FR}$, $G_{FL}$, $G_{RR}$ and $G_{RL}$ on the basis of the variations of the respective wheel speeds $V_{FR}$, $V_{FL}$, $V_{RR}$ and $V_{RL}$ calculated in the previous step 101. The step 102 is followed by a step 103 so as to calculate an estimation vehicle speed $V_B$ and an estimation vehicle acceleration $G_B$ in accordance with the following equations.

$$V_{B(n)} = MED(V_{B(n-1)} - \alpha_1 \cdot tc, Vwmax, V_{B(n-1)} + \alpha_2 \cdot tc) \quad (1)$$
$$Vmax = MAX(V_{FR}, V_{FL}, V_{RR}, V_{RL}) \quad (2)$$
$$G_B = (V_{B(n)} - V_{B(n-1)})/tc \quad (3)$$

where MED (operator) represents a selection of the intermediate value in the values expressed in the parenthesis of the equation (1), MAX designates a selection of the maximum value of the values expressed in the parenthesis of the equation (2), the subscript (n) of $V_{B(n)}$ means the currently calculated value, the subscript (n−1) of $V_{B(n-1)}$ means the previously calculated value, $\alpha_1$ and $\alpha_2$ are the deceleration upper limit and acceleration upper limit of the vehicle acceleration which are used to limit the speed difference between the previously calculated vehicle speed $V_{B(n-1)}$ and the present calculated vehicle speed $V_{B(n)}$, and tc represents the period (for example, 4 to 10 msec) for calculation of the vehicle speed.

Returning again to FIG. 4, a step 104 follows to determine a reference speed Vs on the basis of the estimation vehicle speed $V_B$ calculated in the previous step 103, the reference speed Vs being used for decision of the locking tendency of the wheel. The reference speed Vs is obtained in accordance with the following equation (4). That is, the estimation vehicle speed $V_B$ is first multiplied by Ko (Ko=0.7 to 0.95) to obtain a speed corresponding to the target slip ratio and an offset speed Vo is subtracted from the multiplication result.

$$Vs = KoV_B - Vo \quad (4)$$

Here, the substration of the offset speed Vo from the the multiplication result $KoV_B$ is performed in order to maintain a speed difference between the estimation vehicle speed $V_B$ and the reference speed Vs to be above the offset speed Vo irrespective of the estimation vehicle speed $V_B$ becoming small.

In a step 105, parameters (which will hereinafter referred to as wheel parameters) $W_{FR}$, $W_{FL}$, $W_{RR}$, $W_{RL}$ representing the locking tendencies of the respective wheels are calculated on the basis of the estimation vehicle acceleration $G_B$ and the reference speed Vs in accordance with the following equation.

$$W_{} = A \cdot (V_{} - Vs) + B \cdot (G_{**} - G_B) \quad (5)$$

where the symbol  of $W_{}$, $V_{}$ or $G_{}$ represent one of the respective wheels FR, FL, RR and RL.

In the calculation results, when $W_{} > 0$, the corresponding wheel is not in the locking tendency, and when $W_{} < 0$, the corresponding wheel enters into the locking tendency. $|W_{}|$ represents the magnitude of the locking tendency. In the anti-lock control, if $W_{} < 0$, the braking hydraulic pressure is maintained or decreased.

A step 106 is provided in order to determine whether the motor vehicle is under the anti-lock control. If so, control jumps to a step 109, and if not, control advances to a subsequent step 107. The step 107 is for determining the locking tendency of each wheel. That is, the wheel parameter $W_{}$ obtained in the step 105 is compared with a control start level $-Kw$ (Kw is a positive constant). As a result of this comparison, if at least one of the wheel parameters $W_{}$ is smaller than $-Kw$, control goes to a step 108 to start the anti-lock control. On the other hand, if in the step 107 all of the wheel parameters $W_{FR}$, $W_{FL}$, $W_{RR}$ and $W_{RL}$ are determined to be greater than $-Kw$, the decision is made such that all the wheels are not in the locking tendency, thereby returning to the step 101. In the step 108, the anti-lock control is started with the pump 51 being driven by a motor (not shown), i.e., being set to be in the ON state.

A step 200A is provided to determine whether the vehicle driver strongly presses the braking pedal 2 or lightly presses the braking pedal 2. Under the fact that the deceleration of the wheel is small on the light or soft braking operation and the time from the start of the pressing of the braking pedal 2 up to generation of the locking tendency in the wheel is long, the decision of the light or soft braking is made when satisfying the following condition.

$$G_{**} > Ks \text{ and } T_{ST} > K_{ST}$$

where $G_{}$ represents the wheel acceleration under the condition of $W_{} < -Kw$ in the step 107, Ks designates a constant to be set to be about $-3$ to $-5G$, $T_{ST}$ is the time from the turning-on of a braking switch 53 (FIG. 1) for detecting the braking operation up to the start of the anti-lock control (the time $T_{ST}$ may be measured by the well-known software timer technique), and $K_{ST}$ is a constant to be set to be about 0.1 to 0.5 (sec).

If in the step 200A the decision is made as the light braking operation, control goes to a step 200C, and if the decision is not made as the light braking operation (strong braking operation), control advances to a step 200B. In the steps 200B and 200C is set an intial value $D_{0}$ of the duty ratio $D_{}$ for drive of the two-position valves 15, 25 35 and 45 corresponding to the respective wheels 11, 21, 31 and 41. In the step 200B, $D_{0**}$ is set to be D1, and in the step 200C, it is set to be D2 (D1>D2).

Thereafter, control goes to the step 109 to check whether the state that all of the wheel parameters $W_{FR}$, $W_{FL}$, $W_{RR}$, $W_{RL}$ are greater than 0 continues for a predetermined time Te (for example, 0.5 to 2 sec.). If the decision is "YES", under the decision that the wheel locking tendencies are completely eliminated, control goes to a step 110 to deenergize (set to OFF state) the pumps 51 and 52 and further to stop the energizations of the two-position valves 15, 25, 35 and 45 (set them to the OFF states) to terminate the anti-lock control, whereby the operational flow returns to the step 101. On the other hand, if the decision in the step 109 is negative, under the decision that the wheel locking tendencies are not eliminated, control goes to steps 111 to 113 for execution of the anti-lock control.

In the step 111, the duty ratio D for driving the two-position valves 15, 25, 35 and 45 in accordance with the magnitudes of the locking tendencies of the respective wheels 11, 21, 31 and 41 is calculated on the basis of the wheel parameter W and the initial value Do** in accordance with the following equation.

$$D_{} = Do_{} - \int K_D \cdot W_{**} dt \quad (6)$$

where $K_D$ is a positive constant.

In the step 112, it is checked whether correction of the calculated duty ratio D is required or not. If required, control advances to the 113 so as to correct the calculated duty ratio D. If not required, the operational flow returns to the step 101. The decision in the step 112 is made in accordance with whether the calculated duty ratio D being 100%. For example, if the calculated duty ratio $D_{FR}$ for the front-right wheel two-position valve 15 is 100%, control goes to the step 113 in which the duty ratio $D_{RL}$ of the two-position valve 45 for the rear-left wheel 41 which is in the corresponding relation to the front-right wheel 11 is compulsively corrected to be 0%. Here, when both the calculated duty ratios $D_{FR}$ and $D_{RL}$ for the two-position valves 15 and 45 are 100%, the magnitude |W| of the locking tendency is checked so that the pressure-decreasing correction is preferentially made for the wheel whose locking tendency is greater.

Figure 5A:
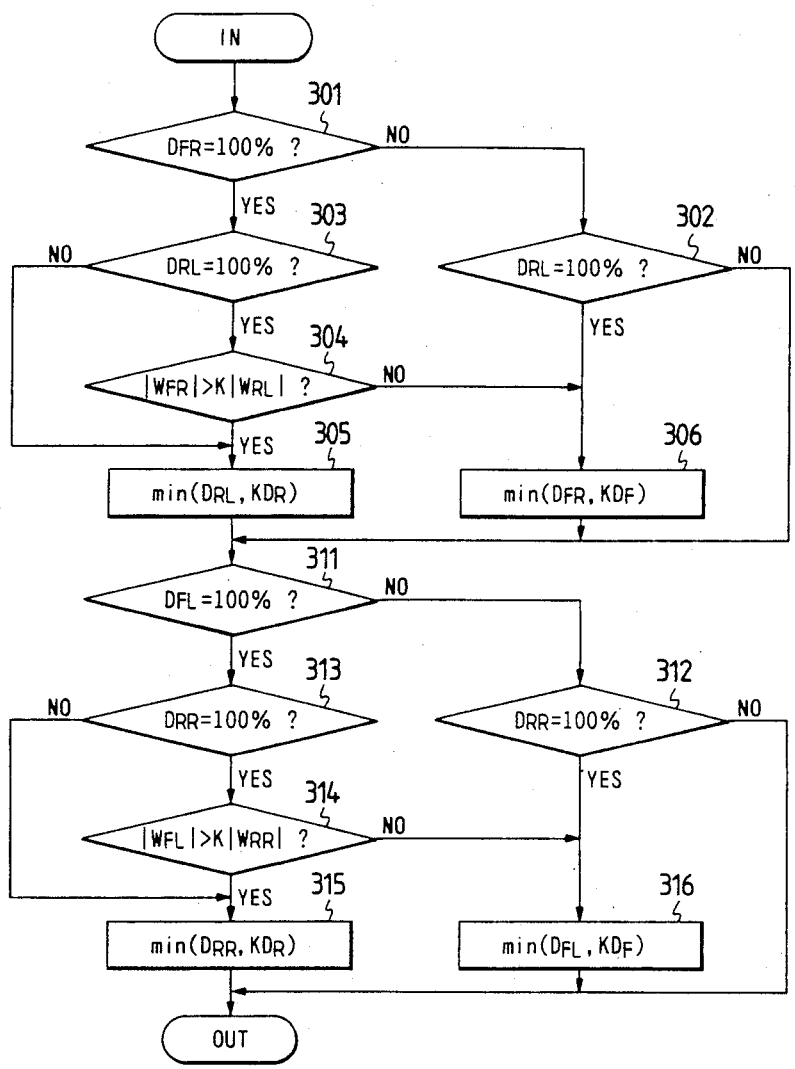
FIG. 5A is a flow chart for in more detail describing the FIG. 4 operation.

FIG. 5A is a flow chart for further describing the operations of the steps 112 and 113 in FIG. 4. In FIG. 5A, a step 301 is first executed so as to check whether the duty ratio $D_{FR}$ for the front-right wheel two-position valve 15 is 100%. If the decision is negative, control goes to a step 302. In the step 302, it is checked whether the duty ratio $D_{FR}$ for the front-right wheel two-position valve 15 is 100%. If the decision is negative, control goes to a step 311. Similarly, in the state 311, it is checked whether the duty ratio $D_{FL}$ for the front-left wheel two-position valve 25 is 100%, and in a step 312, it is checked whether the duty ratio $D_{RR}$ for the rear-right wheel two-position valve 35 is 100%. If both the decisions in the steps 311 and 312 are negative, this operation is terminated.

On the other hand, if the decision in the step 301 is affirmative, control proceeds to a step 303 so as to check whether the duty ratio $D_{RL}$ for the rear-left wheel two-position valve 45 is 100%. If the decision is negative, control goes to a step 305. If the decision is affirmative, control advances to a step 304 to check whether $|W_{FR}| > k|W_{RL}|$ to perform the comparison between the locking tendencies of the front-right wheel 11 and rear-left wheel 41. Here, $|W_{FR}|$ is the absolute value of the front-right wheel parameter, $|W_{RL}|$ is the absolute value of the rear-left wheel parameter, and k is a constant.

If the decision in the step 304 is affirmative, since the locking tendency of the front-right wheel is great, the duty ratio $D_{RL}$ is corrected as follows in the step 305.

$$D_{RL} = \min(D_{RL}, KD_R)$$

where operator min is for selection of the minimum value of the values in the parenthesis, and $KD_R$ is a constant to be set to be 0%. Here, it is also appropriate to set the constant $KD_R$ to 10%, for example.

With the above calculation, the duty ratio $D_{FR}$ is 100%, the duty ratio $D_{RL}$ is set to be equal to $KD_R$ or be below $KD_R$.

If the decision in the step 304 is negative, since the locking tendency of the rear-left wheel 41 is great, the duty ratio $D_{FR}$ is corrected as follows in a step 306.

$$D_{FR} = \min(D_{FR}, KD_F)$$

where $KD_F$ is a constant which is set to be 0%. It is also appropriate to set the constant $KD_F$ to 20%, for example.

With this calculation, in the case that both the duty ratios $D_{FR}$ and $D_{RL}$ are 100% and the locking tendency of the rear-left wheel 41, the duty ratio $D_{FR}$ is set to be equal to $KD_F$ or be below $KD_F$. Similarly, if the decision in the step 302 is affirmative, the step 306 is executed.

Thereafter, control advances to steps 311 to 316 which perform processes for the front-left and rear-right wheel systems. These processes are the substantial same as the processes in the steps 301 to 306 and therefore the description thereof will be omitted for brevity.

Figure 5B:
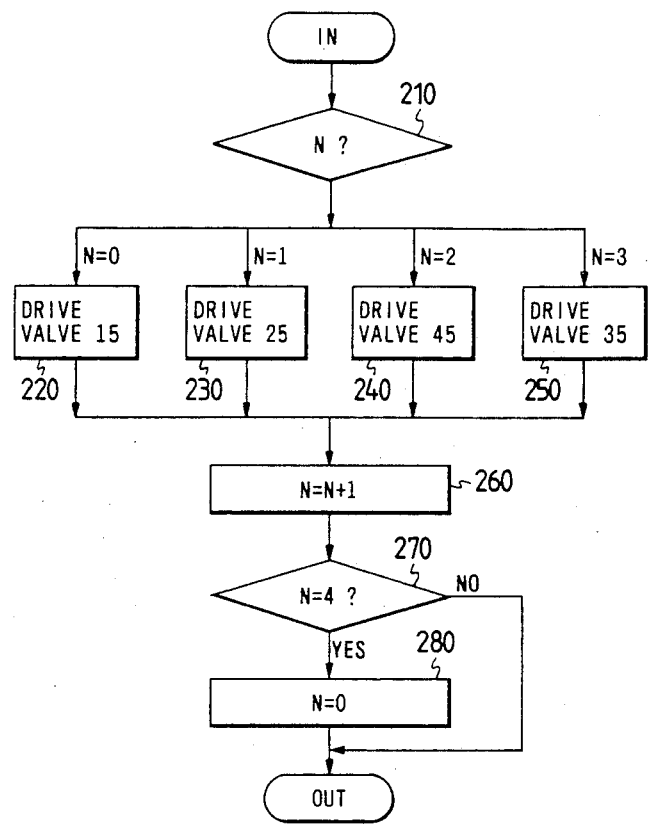
FIG. 5B is a flow chart showing the driving operations of the two-position valves executed in accordance with the determined duty ratios.

FIG. 5B is a flow chart showing the driving operations of the two-position valves 15, 25, 35 and 45 according to the duty ratios, the driving operations being performed in an interrupt routine. This interrupt routine is performed at every T/4 (T is the period of this duty control).

A step 210 is first executed in order to check the value N of a counter and is then followed by the next step in accordance with the value N of the counter. That is, when the counter value =0, control goes to a step 220 to energize (turn ON) the front-right wheel two-position valve 15 and to set the energization (ON) time into a first software timer. When the counter value N=1, control advances to a step 230 to energize the front-left wheel valve 25 and to set the energization time into a second software timer. When the counter value N=2, the step 210 is followed by a step 240 so as to energize the rear-left wheel valve 45 and to set the energization time into a third software timer. When the counter value = 3, the step 210 is followed by a step 250 to energize the rear-right wheel valve 35 and to set the energization time into fourth software timer. Thereafter, a step 260 is executed to add 1 to the counter value N, then followed by a step 270 to check whether N=4. If not, this process is terminated, and if so, the step 270 is followed by a step 208 so as to set the counter value N to 0. In accordance with the value of a free running counter provided in the CPU of the ECU 60, the energization time (ON time) of each two-position valve is checked, and in response to elapse of the energization time, the drive signal to the two-position valve is stopped (turned OFF).

Figure 6:
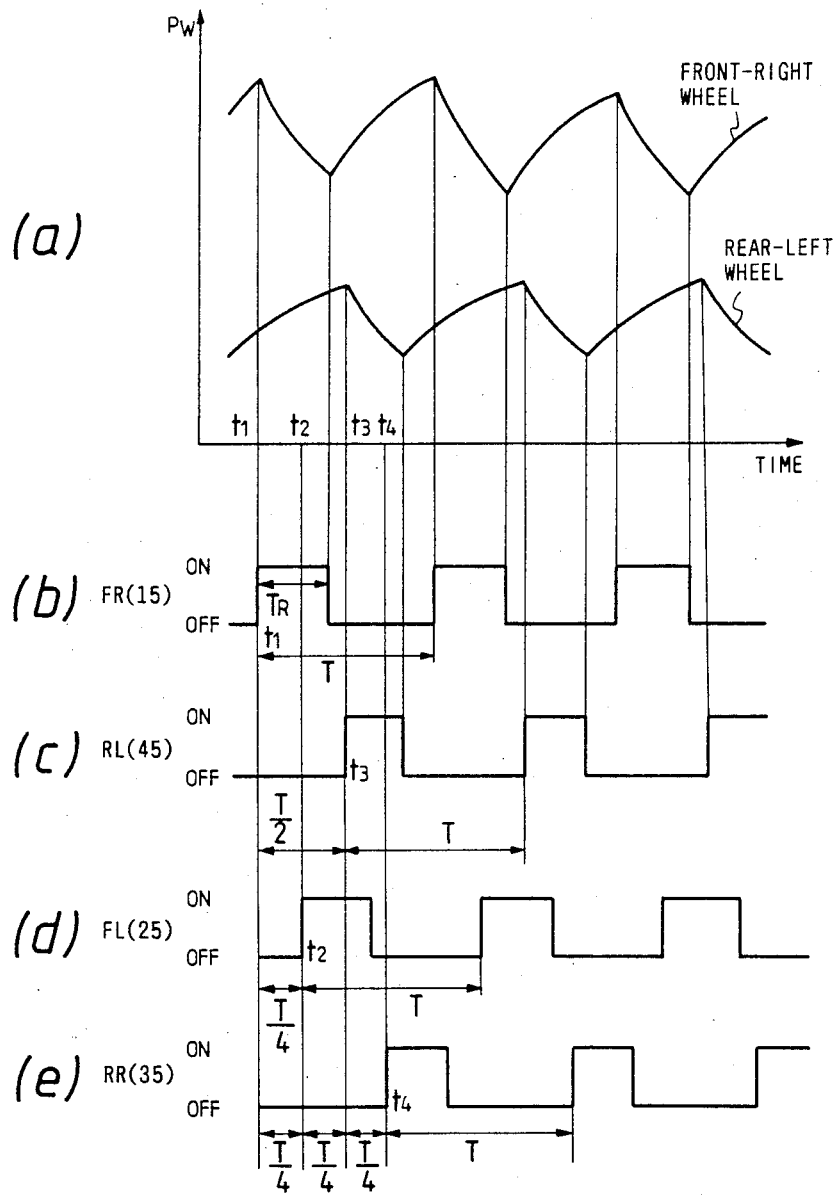
FIGS. 6(a)–6(e), 7(a)–7(c), 8(a)–8(c) and 9 are timing charts for describing the anti-lock operation in the first embodiment.

A description will be made hereinbelow in terms of the anti-lock operation with reference to FIGS. 6 to 9. In FIG. 6, (a) represents wheel-braking cylinder pressure Pw in the first hydraulic pressure system 100 for the front-right wheel 11 and the rear-left wheel 41, and (b) to (e) show the drive signals for the two-position valves 15, 25, 35 and 45 associated with the front-right wheel 11, front-left wheel 21, rear-right wheel 31 and rear-left wheel 41, respectively. Here, the front-wheel side braking hydraulic pressure is higher than the rear-wheel side braking hydraulic pressure. At time t1, by the process of the step 220, the valve 15 is turned ON, whereby the braking hydraulic pressure for the front-right wheel 11 is decreased for a time period $T_R$ as illustrated at (a) of FIG. 6. At this time, the valve 45 is in the deenergized state and assumes the pressure-increasing state. After elapse of T/4 from the time t1, at time t2, the valve 25 is turned ON by the process of the step 230 so that the braking pressure for the front-left wheel 21 is decreased. Further, at time t3 elapsed by T/4 from the time t2, the valve 45 is turned ON by the process of the step 240, whereby the braking pressure for the rear-left wheel 41 is decreased as shown in (a) of FIG. 6. In addition, at time t4 elapsed by T/4 from the t3, the valve 35 is turned ON by the process of the step 250 so as to cause the braking pressure for the rear-right wheel 31 to be decreased.

At this state, as illustrated in (b) and (c), the phases of the duty control for the front-right wheel 11 and the rear-left wheel 41 are shifted by T/2 from each other and the ON (pressure-decreasing) time periods of the valves 15 and 45 in the first hydraulic pressure system 100 are not overlapped with each other, and therefore, the rear-left wheel braking pressure which is lower than the front-right wheel braking pressure is allowed to be decreased in correspondance with the ON time period.

Figure 7:
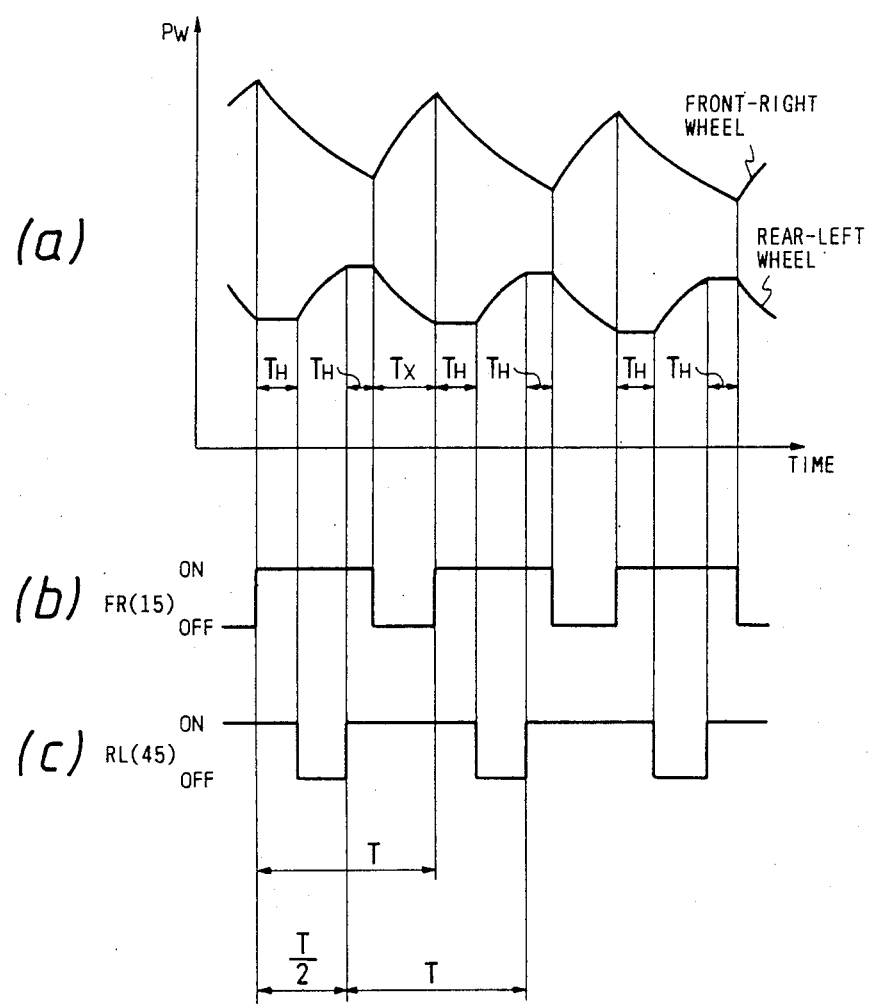
Figure 8:
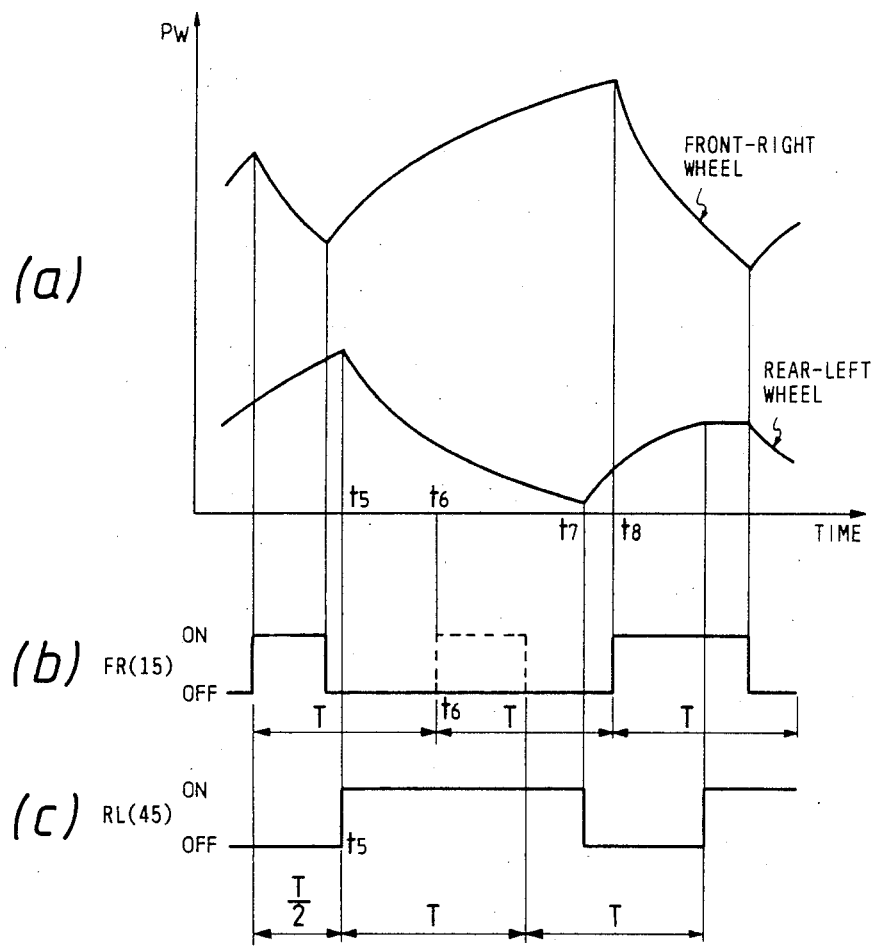

Moreover, as illustrated in FIG. 7, in the case that the ON time periods of the valves 15 and 45 are partially overlapped with each other, the braking liquid for the front-right wheel 11 for which the braking pressure is higher is preferentially sucked by the pump 51 during this overlapping time period $T_H$, whereby the braking pressure for the rear-left wheel 41 is maintained as illustrated in (a) of FIG. 7. Here, the front-right wheel side valve 15 is turned OFF and the braking pressure for the rear-left wheel 41 enters into the decreased state for the non-overlapping time period $T_X$. Even in such a case, the braking pressure for the rear-left wheel 41 can be adjustable under the duty control. When both the valves 15 and 45 in the first hydraulic pressure system 100 are turned ON, by means of the works of the check valves 16 and 46, the braking liquid flows from the pressure-higher wheel-braking cylinder into the pressure-lower wheel-braking cylinder, thereby preventing the braking hydraulic pressure from being increased.

Moreover, the braking pressure for the rear-left wheel 41 (for example) can be required to be rapidly decreased immediately before locking. In this case, the maintaining of the braking pressure provides the possibility that difficulty is encountered to meet a desirable rapid pressure-decreasing. Thus, in the step 111 of FIG. 4, the duty ratio of the rear-left wheel side valve 45 is set to 100%. Accordingly, after the execution of the step 111, control goes through the step 112 to the duty-ratio correction step 113, in which the duty ratio of the valve 15 for the front-right wheel 11 which is in the corresponding relation to the rear-left wheel 41 in the first hydraulic pressure system 100 is corrected to be $KD_F$, preferably 0%, under no condition. That is, as shown in (c) of FIG. 8, when at time t5, the drive duty ratio of the valve 45 is calculated to be 100%, even if the drive duty ratio of the valve 15 is calculated to be 40% at time t6, it is corrected to be 0% so as not to produce an ON signal as indicated by a dotted line in (b) of FIG. 8. Thus, the braking pressure of the rear-left wheel 41 which requires the rapid pressure-decreasing is preferentially decreased as shown in (a) of FIG. 8. When the rear-left wheel braking pressure is sufficiently decreased and the valve 45 is turned OFF at time t7, the front-right wheel braking pressure is ordinally duty-controlled after time t8.

Here, in the step 111, when both the calculated duty ratios for the valves 15 and 45 become 100%, the locking tendencies $|W_{**}|$ are checked so that the braking pressure of the wheel having the greater locking tendency is preferentially decreased.

Since the duty ratio $D_{}$ becomes greater when the wheel locking tendency is greater (when $W_{}<0$), the braking pressure $Pw_{}$ in the wheel-braking cylinder becomes smaller, i.e., is decreased, and since the duty ratio $D_{}$ becomes smaller when the wheel locking tendency is smaller (when $W_{}>0$), the braking pressure $Pw_{}$ therein becomes greater, i.e., is increased. That is, under the anti-lock control, the duty ratio $D_{}$ varies on the basis of the wheel locking tendency in accordance with the above-mentioned equation (6) so that the braking pressure $Pw_{}$ in the wheel-braking cylinder is controlled so as to accommodate the vehicle-running road surface.

Figure 9:
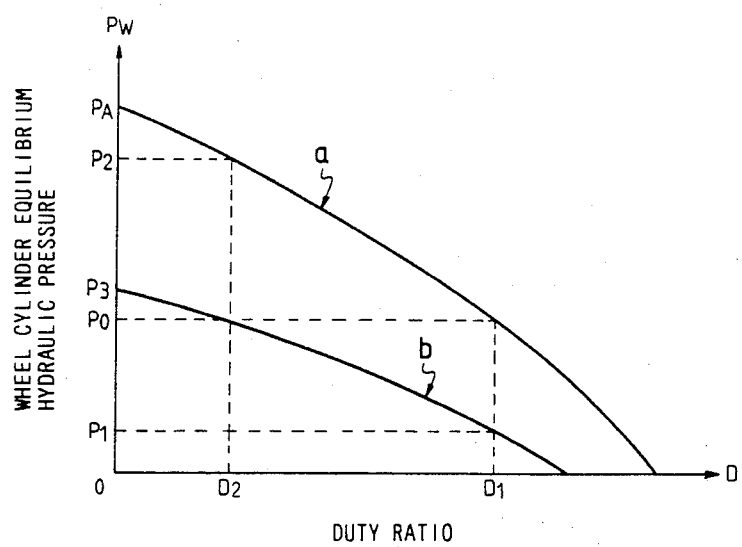

Here, the relation between the duty ratio D and the braking pressure Pw varies in accordance with the master-cylinder braking hydraulic pressure (depressing force for the braking pedal 2 by the vehicle driver) as illustrated in FIG. 9. In FIG. 9, when the master-cylinder hydraulic pressure $P_M$ is high, i.e., assumes a value $P_A$ ($P_M=P_A$), the relation between the duty ratio D and the wheel-braking cylinder equilibrium hydraulic pressure Pw is as indicated by a curve a, and on the other hand, when the master-cylinder hydraulic pressure $P_M$ is low, i.e., assumes a value $P_B$ ($P_M=P_B$), it results in being as indicated by a curve b. For example, assuming that the optimal value of the braking hydraulic pressure (equilibrium pressure) $Pw_{**}$ in the wheel-braking cylinder when the vehicle is running on a given road surface is Po, in the case that the master-cylinder hydraulic pressure $P_M$ is high ($P_M=P_A$), the duty ratio corresponding to the optimal value Po becomes D1.

In this embodiment, when the master-cylinder hydraulic pressure $P_M$ is high (strong braking operation), the initial value $Do_{}$ of the duty ratio D is set to be D1, and the braking hydraulic pressure $Pw_{}$ quickly becomes the optimal value Po immediately after start of the anti-lock control.

Similarly, when the master-cylinder hydraulic pressure $P_M$ is low ($P_M=P_B$), the duty ratio corresponding to the optimal value Po is D2. In the case that the master-cylinder hydraulic pressure is low (soft braking operation), the initial value $Do_{}$ of the duty ratio D is set to be D2, and therefore the braking hydraulic pressure $Pw_{}$ in the wheel-braking cylinder quickly assumes the optimal value Po immediately after start of the anti-lock control.

Thus, in this embodiment, since the initial value $Do_{**}$ of the duty ratio D is arranged to be varied in accordance with the braking condition (strong braking or soft braking), irrespective of the depressing force of the braking pedal 2 by the vehicle driver, it is possible to adequately perform the anti-lock control immediately after the start, thereby reducing the wheel locking tendency to a minimum so as to improve the stability and controllability of the motor vehicle.

In this embodiment, the phases of the duty control for the four wheels are shifted by T/4 from each other. This is for the purpose of smoothing the pressure ripple of the master cylinder 1 due to the two-position valve duty control, thereby reducing the degree of the braking pedal kickback, vehicle vibration, control noise and others. Here, it is also appropriate that the four wheels are freely paired and the phases for the paired wheels are coincident with each other and the phase for the paired wheels is different by T/2 from the phase for the different paired wheels.

In addition, although in this embodiment the initial valve of the duty ratio is determined to be one selected from the two values in accordance with the decision between the strong braking and the soft braking, it is also appropriate to select one from three or more initial values in accordance with the degree of the depressing operation of the braking pedal 2. Further, it is appropriate to continuously vary the initial value of the duty ratio on the basis of the wheel acceleration Gw at the time of start of the anti-lock control and the time $T_{ST}$ from the turning-on of the brake switch 53 up to the control strat. Still further, although in this embodiment the initial values (D1, D2) of the duty ratio are used in common for the front and rear wheels, it is also appropriate that the initial value for the front wheel is different from the initial value for the rear wheel.

Figure 10:
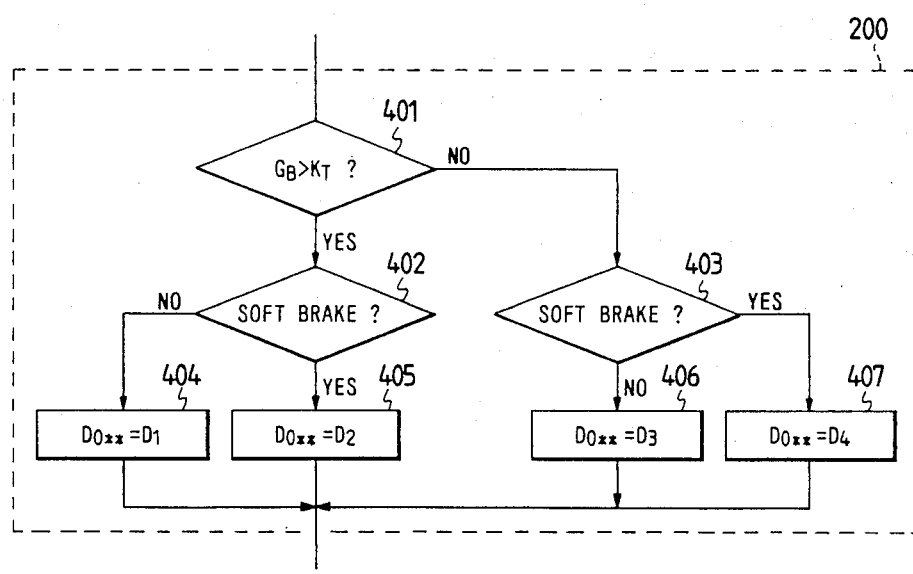
FIG. 10 is a flow chart showing anti-lock control to be executed in a second embodiment.
Figure 11:
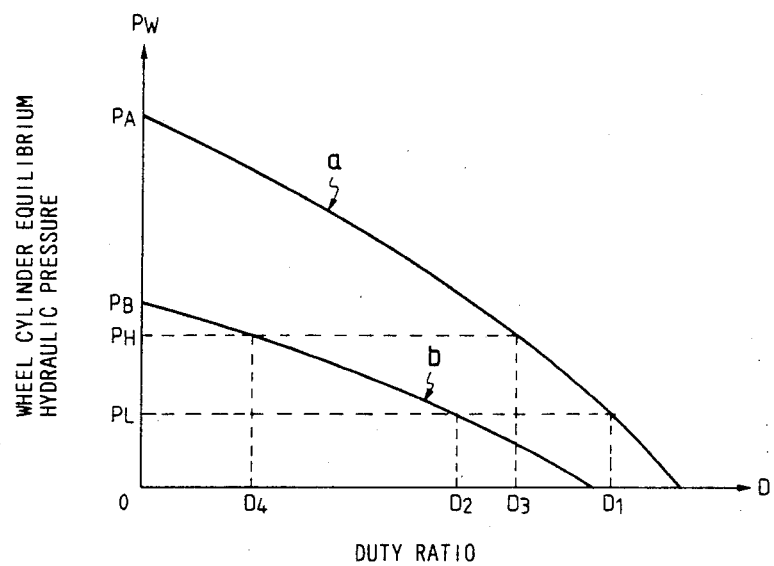
FIG. 11 is a graphic illustration for describing the second embodiment.

A second embodiment of this invention will be described hereinbelow with reference to FIGS. 10 and 11. Although in this embodiment the target value of the braking pressure in the wheel-braking cylinder at the time of the control start is set to be a specific pressure Po and the initial value of the duty ratio corresponding to the specific pressure Po is switched in accordance with the decision between the strong braking and soft braking, the second embodiment is arranged so as to vary the value of the specific pressure Po in accordance with the vehicle-running road surface condition to change the initial value of the duty ratio in accordance therewith. Since the second embodiment is different from the first embodiment only in terms of the processes indicated by numeral 200 in FIG. 4, the description of the second embodiment will be made only for the 200-indicated processes which are executed only at the time of start of the anti-lock control.

A step 401 is first executed to compare the calculated estimation vehicle acceleration $G_B$ with a reference value $K_T$ (for example, $K_T = -0.2G$ to $-0.5G$). If $G_B > K_T$, control goes to a step 402, and if $G_B > K_T$, control goes to a step 403. In the steps 402 and 403, it is checked in the same manner as the step 108 in FIG. 4 whether the braking operation is a soft braking or a strong braking. If the decision in the steps 402 and 403 is made as the soft braking, control goes to a step 405 or a step 407. In the step 405, the intial value Do of the duty ratio is set to be D2 (<D1), and in the step 407, the initial value Do is set to be D4 (<D3). After the execution of the step 405 or 407, the operational flow advances to the step 111 of FIG. 4. On the other hand, if the decision in the step 402 or 403 is negative, control goes to a step 404 or 406. In the step 404, the initial value Do** is set to D1, and in the step 406, it is set to D3. Thereafter, control is continued to the step 111 of FIG. 4. Here, D1, D2, D3 and D4 are set as D1 > D2, D3 > D4, D1 > D3, D2 > D4.

The step 401 is provided in order to check the road surface frictional coefficient by checking the magnidue of the estimation vehicle acceleration $G_B$. That is, in the case of the low-friction road surface having an easily slipping characteristic, the vehicle deceleration in braking is small, and in the case of the high-friction road surface, the vehicle deceleration is great. In accordance with this fact, it is possible to determine the magnitude of the road surface frictional coefficient on the basis of the magnitude of the estimation vehicle acceleration $G_B$.

Although in the above-mentioned first embodiment the initial value of the duty ratio is determined only on the basis of the decision (selection) between the strong braking and the soft braking, in this embodiment, additionally, the intial value of the duty ratio is changed in accordance with the road surface frictional coefficient, and therefore it is possible to more adequately determine the initial value of the duty ratio. More specifically, since the optimal value of the braking pressure Pw in the wheel-braking cylinder resulting from the condition that the road surface frictional coefficient is great is greater than the optimal value taken when the road surface frictional coefficient is small, when as illustrated in FIG. 11 the optimal value of the braking pressure when the motor vehicle is running on a road surface whose frictional coefficient is great is $P_H$ and the optimal value of the braking pressure when running on a road surface whose frictional coefficient is small is $P_L$, the initial value Do in the case of running on the low-friction road surface is set to be D1 or D2 in accordance with the degree of the braking operation, and the initial value Do** in the case of the high-friction road surface is set to be D3 or D4 in accordance with the degree of the braking operation. Therefore, it is possible to adequately determine, or switch, the initial value of the duty ratio in accordance with the road surface condition and the degree of depression of the braking pedal 2 by the vehicle driver, thereby allowing adequate anti-lock control immediately after the start.

Here, although in the second embodiment the anti-lock control is effected in accordance with the two road surface conditions checked by the estimation vehicle acceleration, it is also appropriate to effect the anti-lock control in accordance with three or more road surface conditions. Further, it is also possible to continuously vary the initial value of the duty ratio as a function of the time $T_{ST}$ and the estimation vehicle acceleration $G_B$. Still further, it is appropriate to switch the initial value only on the basis of the estimation vehicle acceleration irrespective of the decision of the degree of the braking operation by the vehicle driver. In addition, although in this embodiment the road surface condition is determined from the estimation vehicle acceleration, it is also appropriate to determine the road surface condition on the basis of the difference between the estimation vehicle speed $V_B$ and the wheel speed V**.

Moreover, although in the above-mentioned embodiments the duty ratio initial value calculation is made in terms of the two-position valve having the pressure-increasing position and pressure-decreasing position, it is also appropriate to use a different control valve such as a valve adapted to continuously adjust the braking pressure in accordance with the supplied drive current. In this case, under the condition that the drive current I is obtained in accordance with the following equation, the initial value Io of the drive current I** may be varied in accordance with the degree of the braking operation and the road surface condition.

$$I = Io - \int K1 \cdot W** dt$$

where K1 is a positive constant.

Furthermore, although in the above-mentioned embodiments the decision between the strong braking and soft braking is made by using the time $T_{ST}$ from the turning-on of the braking switch 53 to the start of the anti-lock control, because the ON/OFF switching positions of the braking switch 53 are different from each other, it is appropriate to correct the comparison value $K_{ST}$ on the basis of the time from the ON time of the braking switch 53 up to generation of variation of the vehicle acceleration.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An anti-lock brake control system for use in a motor vehicle having at least a pair of wheels, comprising:

hydraulic pressure supply means for applying a braking pressure from a master cylinder of said motor vehicle to a pair of wheel-braking cylinders for braking said pair of wheels;

a pump provided in said hydraulic pressure supply means to decrease both the braking hydraulic pressures in said pair of wheel-braking cylinders;

a pair of control valves having three ports and provided in said hydraulic pressure supply means, each of said pair of control valves being arranged to have a first position at which said master cylinder is communicated with each of said pair of wheel-braking cylinders and a suction side of said pump is disconnected to said wheel-braking cylinder and further have a second position at which said master cylinder is disconnected to said wheel-braking cylinder and said suction side of said pump is communicated with said wheel-braking cylinder; and electronic control means for effecting duty control of said pair of control valves so that the time periods at which said pair of control valves are at said second positions are not overlapped with each other.

2. A system as claimed in claim 1, wherein said electronic control means controls said pair of control valves so that, when the braking pressure in one of said pair of wheel-braking cylinders is rapidly decreased, one of said pair of control valves takes said second position and the other control valve takes said first position.

3. A system as claimed in claim 1, wherein said wheel-braking cylinders are coupled through check valves to said pump, respectively.

4. A system for use in a motor vehicle having four wheels, comprising:

a hydraulic pressure supply means for applying a braking pressure from a master cylinder of said motor vehicle to a wheel-braking cylinder for braking said wheel;

a pump provided in said hydraulic pressure supply means to decrease the braking hydraulic pressure in said wheel-braking cylinder;

control valve means provided between said master cylinder and said wheel-braking cylinder in said hydraulic pressure supply means so as to increase and decrease the braking pressure in said wheel-braking cylinder;

wheel speed sensor means for obtaining a speed of said wheel;

locking tendency decision means for determining a locking tendency of said wheel on the basis of the obtained wheel speed;

initial value setting means for setting an initial value of a duty ratio of said control valve means to be used when said anti-lock control system starts the anti-lock control, in accordance with at least one of the degree of operation of braking means effected by a vehicle driver and a condition of a road surface on which said motor vehicle is running;

duty ratio calculation means for calculating the duty ratio of said control valve means on the basis of the determined locking tendency and the set initial value; and duty driving means for duty-driving said control valve means with the duty ratio calculated by said duty ratio calculation means.

5. A system as claimed in claim 4, wherein said initial value setting means is arranged to detect a time period from a start of the operation of said braking means to a start of the anti-lock control and further determine the degree of the operation of said braking means on the basis of an acceleration of said wheel at the time of the start of the anti-lock control, so that said initial value is set to become smaller as the operation degree of said braking means is smaller.

6. A system as claimed in claim 4, wherein said initial value setting means is arranged to determine a frictional coefficient of the road surface on the basis of an acceleration of said motor vehicle at the time of the start of the anti-lock control so that said initial value is set to become greater in accordance with increase in the determined road surface frictional coefficient.

7. A system as claimed in claim 4, wherein said initial value setting means is arranged to determine a frictional coefficient of the road surface on the basis of a variation of the wheel speed with respect to a speed of said motor vehicle so that said initial value is set to become greater in accordance with increase in the determined road surface frictional coefficient.

8. A system as claimed in claim 4, wherein said wheel-braking cylinders are coupled through check valves to said pump, respectively.

9. A system as claimed in claim 4, wherein said initial value setting means is arranged to detect a time period from a start of the operation of said braking means to a start of the anti-lock control and further determine whether said braking means is in a strongly operated condition or a softly braked condition, on the basis of an acceleration of said wheel at the time of the start of the anti-lock control, so that said initial value is set to become smaller as said braking means is in the softly operated condition.

* * * * *